(12) United States Patent
Ishii

(10) Patent No.: US 10,175,479 B2
(45) Date of Patent: Jan. 8, 2019

(54) HIGH CONTRAST PROJECTION SCREEN

(71) Applicant: Fusao Ishii, Pittsburgh, PA (US)

(72) Inventor: Fusao Ishii, Pittsburgh, PA (US)

(73) Assignee: Fusao Ishii, Pittsburgh, PA (US)

( * ) Notice: Subject to any disclaimer, the term of this patent is extended or adjusted under 35 U.S.C. 154(b) by 394 days.

(21) Appl. No.: 14/953,294

(22) Filed: Nov. 27, 2015

(65) Prior Publication Data

US 2017/0153450 A1    Jun. 1, 2017

(51) Int. Cl.
*G02B 27/01*    (2006.01)
*G02B 27/00*    (2006.01)
*G03B 21/56*    (2006.01)
*G03B 21/62*    (2014.01)
*G03H 1/04*    (2006.01)
*H04M 1/02*    (2006.01)
*G03H 1/22*    (2006.01)

(52) U.S. Cl.
CPC ..... *G02B 27/0101* (2013.01); *G02B 27/0018* (2013.01); *G02B 27/0103* (2013.01); *G03B 21/567* (2013.01); *G03B 21/62* (2013.01); *G03H 1/0465* (2013.01); *H04M 1/0272* (2013.01); *G02B 2027/011* (2013.01); *G02B 2027/0109* (2013.01); *G02B 2027/0112* (2013.01); *G02B 2027/0116* (2013.01); *G02B 2027/0118* (2013.01); *G02B 2027/0127* (2013.01); *G03H 2001/2231* (2013.01); *G03H 2001/2239* (2013.01); *H04M 2250/54* (2013.01)

(58) Field of Classification Search
CPC .............. G02B 27/018; G02B 27/0103; G02B 2027/0109; G02B 2027/011; G02B 2027/0112; G02B 2027/0116; G02B 2027/0127; G03B 21/567; G03B 21/62; G03H 1/0465; G03H 2001/2231; G03H 2001/2239; H04M 1/0272; H04M 2250/54
USPC ...................................................... 359/1–35
See application file for complete search history.

(56) References Cited

U.S. PATENT DOCUMENTS

| | | | |
|---|---|---|---|
| 9,759,917 B2* | 9/2017 | Osterhout | .......... G02B 27/0093 |
| 2011/0058240 A1* | 3/2011 | Dell'Eva | .................. G02B 5/32 |
| | | | 359/23 |
| 2011/0091097 A1* | 4/2011 | Umeda | ................. G06K 9/6255 |
| | | | 382/159 |
| 2016/0037146 A1* | 2/2016 | McGrew | ............... H04N 9/3185 |
| | | | 606/27 |
| 2016/0139562 A1* | 5/2016 | Crowder | ................. A63J 21/00 |
| | | | 359/33 |

* cited by examiner

*Primary Examiner* — William R Alexander
*Assistant Examiner* — Grant A Gagnon
(74) *Attorney, Agent, or Firm* — Bo-In Lin

(57) ABSTRACT

An image display system includes a reflecting screen that has a reflecting surface. The reflecting surface includes hologram which reflects narrow bands of spectrum of incident lights toward desired direction. A projection display system includes a reflecting mirror(s) with hologram so that the image can be projected nearly vertical or short distance. This invention can be used as a head-up-display with improved brightness and eliminating ghost noise.

28 Claims, 17 Drawing Sheets

HIGH CONTRAST PROJECTION SCREEN

CROSS REFERENCE TO RELATED APPLICATIONS

This application is a Non-Provisional Application and claims the Priority Date of previously filed Provisional Application 61/855,948 filed on May 28, 2013. This Application is also a Continuation in Part (CIP) Application of another application Ser. No. 11/285,881 filed on Nov. 23, 2005 and issued into U.S. Pat. No. 7,595,828.

TECHNICAL FIELD

This invention relates to a display system for projecting an image on a screen. More particularly, this invention relates to projection screens with improved image quality by using wavelength selective reflecting film including at least one of hologram, multi-layer dielectrics and cholesteric liquid crystal as a screen to reflect only selected wavelengths of light to improve the brightness and contrast of images. This invention also improves the image quality of head-up-display (hereafter "HUD") using a wavelength selective screen with improved brightness.

BACKGROUND OF THE INVENTION

Image display on a front projection screen often encounters a difficulty that the viewers of such image often experience a poor contrast due to the interferences from the ambient lights reflected from the projection screen. The interferences from ambient reflection are especially pronounced in a well-lighted room. For this reason, it is often required to turn off the light in a room to provide a better view of the displayed image. One method to overcome the poor view of image is to project the image with higher luminance. However, the ambient reflections often cause uncomfortable glares in a viewer's eyes when the front projection screen is projected with the high power projectors. Conventional technologies for providing high contrast projection screens are still limited by the difficulties that the screens are either manufactured with multiple layers or requiring special processes or materials. Such multiple layered screen or specially processed surface are usually complicated to fabricate and very costly. Front end projection display with reflective type of display screens are therefore limited by these technical difficulties and also by the economic limitations since it is very expensive to provide the high contrast projection screen with ambient light elimination or reduction.

Braun et al. disclose in U.S. Pat. No. 5,335,022 a front projection video display system that implements a combination of components to overcome the difficulties caused by the ambient reflections. The video display system includes components of a front-projection video projector which projects an image of particular direction of polarization; polarizing lenses which polarize light radiated from room light fixtures in a direction orthogonal to that of the projected image; a polarizing filter to substantially transmit light polarized parallel to the projected image and substantially blocks light orthogonal to the projected image; and a polarization maintaining (PM) projection screen to receive the projected image for viewing by the viewers. Such systems however are more costly and difficult to implement due to the several components required to combine into a low contrast video projection system. The polarized projection screen further reduces the light intensity and leads to an undesirable effect of reducing the brightness of the display images due to the fact that only the light beams of specific polarization are reflected. With the polarizer, this method reduces the ambient light by half, but it does not provide a complete solution because there are still significant interferences caused by the remaining unnecessary ambient light.

Lambert et al. disclose in U.S. Pat. No. 6,597,501 a projection screen to provide an improved contrast between projected light and ambient light. The projection screen includes a light-absorbing layer and an active layer located in front of said light-absorbing layer. The active layer is transparent to light having a first direction of polarization and reflective to light having a second direction of polarization. The reflecting polarizing layer may be provided between the active layer and the light-absorbing layer. Again, this multiple layered screen with polarization reflection is more costly and complicate to implement. Furthermore, the polarization projection as discussed above leads to reduced brightness of display images thus degrades the image quality Again, like what are discussed above, by applying the polarizer, this method reduces the ambient light by half, but it does not provide a complete solution due to the significant interferences caused by the remaining unnecessary ambient light.

Kuoda et al. disclose in U.S. Pat. No. 6,842,282 a front projection screen that has a front shading sheet facing a viewing side formed with a transparent material. The front shading sheet has a front surface provided with a plurality of horizontal, parallel, minute ridges and these minute ridges have a triangular cross section and each having an upper side surface coated with a shading layer. The projection screen further includes a rear transparent filler layer formed with a material having a refractive index nearly equal to that of the transparent material of the front shading sheet. Furthermore, transparent glass beads are embedded uniformly in a plane in the rear surface of the transparent filler layer and the rear surface of the transparent filler layer is coated with a white, reflecting adhesive layer. An opaque film impermeable to light is applied to the rear surface of the reflecting adhesive layer. The front projection screen has a large viewing angle, does not reflect an environmental image even in a light environment, and is capable of displaying a high-definition image having a high black level and a high contrast. However, as can be clearly understood, such multiple layered projection screen embedded with beads are costly and inconvenient to implement. Furthermore, the horizontal ridges as disclosed can only reduce the ambient interferences for light beams incident from above the screen. The horizontal ridges have no effect to reduce the ambient interferences when the incident light beams are projected from a viewer's direction or from other sides of the screen. Therefore, the contrast of image display can only be partially improved due to the limited reductions of ambient reflections.

Ishii disclosed in U.S. Pat. No. 7,495,828 a front projection screen to improve contrast in a bright ambient with a Fresnel parabolic mirror (this inventions is a CIP of this patent). However its embodiment requires a large costly mold. The projection screen is therefore limited in its practical application unless inventive embodiments to achieve lower cost can be realized.

Shimoda et al. disclose in U.S. Pat. Nos. 7,057,809 and 7,408,709 a front projection screen having multi-layers of dielectric materials for reflection of selective wavelength of lights. However the spectrum of the reflected light has wide bandwidth which allows unnecessary reflection as well as its embodiment requires a costly sputtering tool.

A Patent Application Publication 20050128583 discloses a high contrast projection screen by implementing a broadband projection-receiving surface. The surface of the project screen is formed by applying a specialized surface production technology that utilizes purposeful partitioning of the material processes used in sub-wavelength morphology (finish) from the processes used to make super-wavelength morphology. Such specialized production method however requires special processing equipment and materials thus greatly increase the cost and manufacturing complexities of the projection screen.

There are many patents related to projection screen with ambient light reduction or elimination that includes U.S. Pat. Nos. 6,829,086, 6,624,936, 6,346,311, 4,911,529, and 4,566,756, and U.S. Patent Applications including Publications 20030137728, 20010030804, and 20010028501. However, these inventions have not addressed and provided direct resolutions for a person of ordinary skill in the art to overcome the above-discussed limitations and difficulties.

Therefore, a need still exists in the art of image display systems to provide new and improved projection screens to reduce and eliminate ambient light reflections such that the above-discussed difficulties can be resolved.

SUMMARY OF THE INVENTION

It is an aspect of the present invention that the front-end projection screen for reflecting the incident image light beams has hologram formed on a flat surface which absorbs incident lights except very narrow wavelengths coinciding with the wavelengths of the incoming projected lights and changes the direction of reflected lights to horizontal parallel light beams directing to the viewer. The reflectance coefficient is very high when the wavelength of incident light and the designed spectrum of reflectance by the hologram are close. Hologram can also have a function of bending lights as if it forms a free shaped mirror to focus incident lights toward viewers. Because of narrow band of wavelength of reflection, the majority of ambient lights are absorbed and high contrast can be achieved even in a bright room.

It is another aspect that the present invention provides a front and rear projection display systems with free shaped mirrors in a projection optical system. A reflecting surface of hologram can be designed to reflect specified bands of wavelength of light and to bend the direction of reflected lights so that the hologram can be used as a free shaped mirror. Especially short distance projection lens and/or vertical projection lens are very costly and often prohibit the use for low cost projectors. This invention enables to reduce the cost of such expensive free shaped mirrors with flat low cost hologram.

It is another aspect that the present invention provides a method of manufacturing a projection screen by exposing photo-sensitive material with laser interference to form hologram.

This invention also provides a method to form free shaped lens and/or mirrors with hologram.

It is another aspect that the present invention provides a method of manufacturing a projection screen by exposing photo-sensitive material with scanning laser beams using deflectable micromirrors with adjustable and desired incident angles of laser beams, so that large size screen plates can be produced.

It is another aspect that the present invention provides a high brightness screen for HUD (head-up-display), although maintaining high transparency for external view. This invention is also very useful to avoid dual images created by the two surfaces of screen plate.

In yet another aspect, the present invention provides a high brightness screen to project the image of the display of mobile phone on to windshield of automobile maintaining good transparency of external view, so that a drive can see both external view and the image of mobile phone's display without ghost images.

Briefly in a preferred embodiment, this invention discloses a reflecting screen that has a reflecting surface. The reflecting surface includes hologram which is designed to reflect narrow bands of lights and also focus the reflected lights toward viewers. This invention also discloses to make free shaped lens and/or mirrors with hologram inexpensively.

These and other objects and advantages of the present invention will no doubt become obvious to those of ordinary skill in the art after having read the following detailed description of the preferred embodiment, which is illustrated in the various drawing figures.

DESCRIPTION OF PREFERRED EMBODIMENTS

Figure 1:
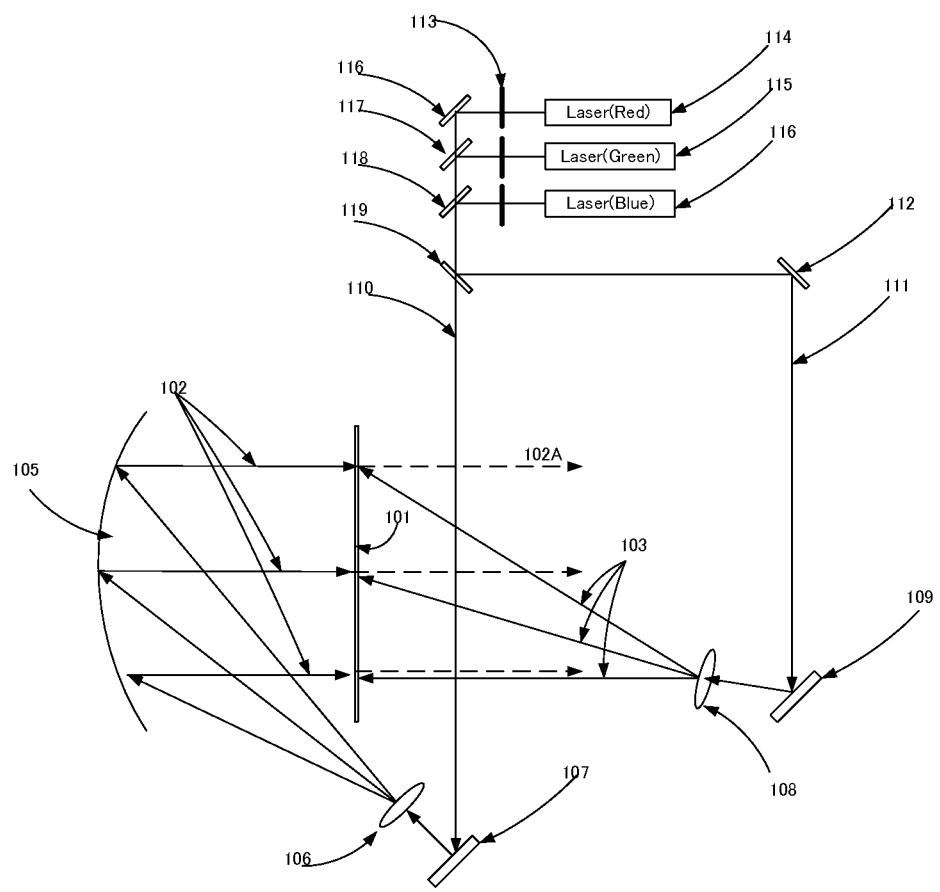
FIG. 1 is a block diagram of an image display system as an exemplary embodiment of this invention that illustrates how to record hologram.

FIG. 1 is a system diagram of an image display apparatus as an exemplary embodiment of this invention that illustrates how to record hologram. The image display apparatus as shown in FIG. 1 comprises laser light sources 114, 115 and 116. The laser light sources emit laser lights having coherence length long enough to create interference on a display screen 101. The display screen 101 is coated with a photographic film (not specifically shown). The photographic film is usually composed of photopolymer, photoresist or silver halide emulsion coated on a plate or film. In this embodiment, the laser lights source are implemented to emit primary colors comprise Blue, Green and Red laser lights. The image display system further includes a shutter 113 to block a laser beam when that laser beam is not needed. Each laser unit has a shutter, so that each laser can be controlled independently. The image display system further includes a mirror 116 to change the direction of laser beam. The image display system further includes dichroic mirrors 117 and 118 wherein the dichroic mirror 117 reflects only Green light and light of other wavelength will be transmitted and the dichroic mirror 118 reflects only Blue light and the rest of light will be transmitted. A beam splitter 119 is disposed at a location to create two coherent laser beams 110 and 111. The laser beam 111 is a reference beam and it is reflected by the mirror 108 and expanded by the lens 108 as if the laser beams 103 are emitted for a point source. The laser beams 103 are implemented in the image display system as a reference beam to create hologram at the screen 101. The beam 110 is collimated by the mirror 105 to project a parallel object beam 102 for creating hologram. After the recording on the photographic film on the screen 101, special treatments including development and fixer are carried out to fix the holographic recording. The processes are the same as photographic film development process including exposure of the film by taking a picture using a camera followed by fixing and making negative film and then using the negative file to print the picture. Holographic recording is the processes of exposure and development to fix the hologram on the photographic film disposed on the screen 101. In FIG. 1, the reference beam is 103 and the object beam is 102. The reference and object beams interfere and record hologram at the screen 101.

Figure 2:
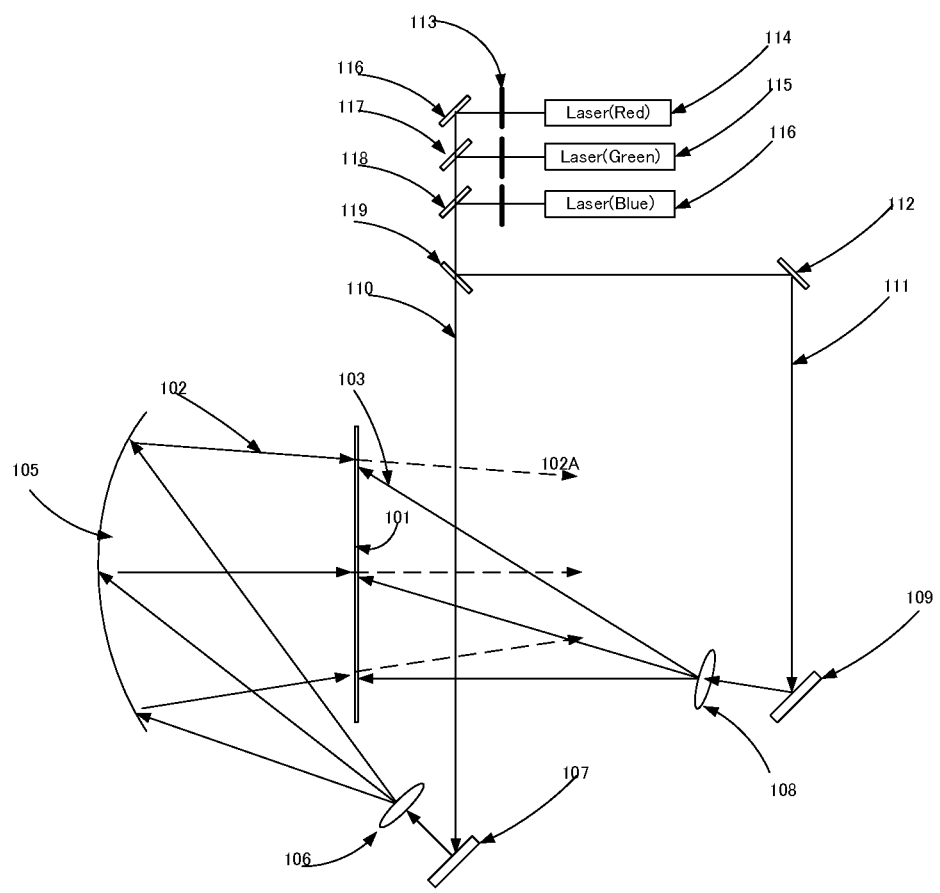
FIG. 2 is a block diagram of an image display system as another exemplary embodiment of this invention that illustrates how to record hologram wherein the object beams are converging instead of parallel as that shown in FIG. 1.
Figure 5:
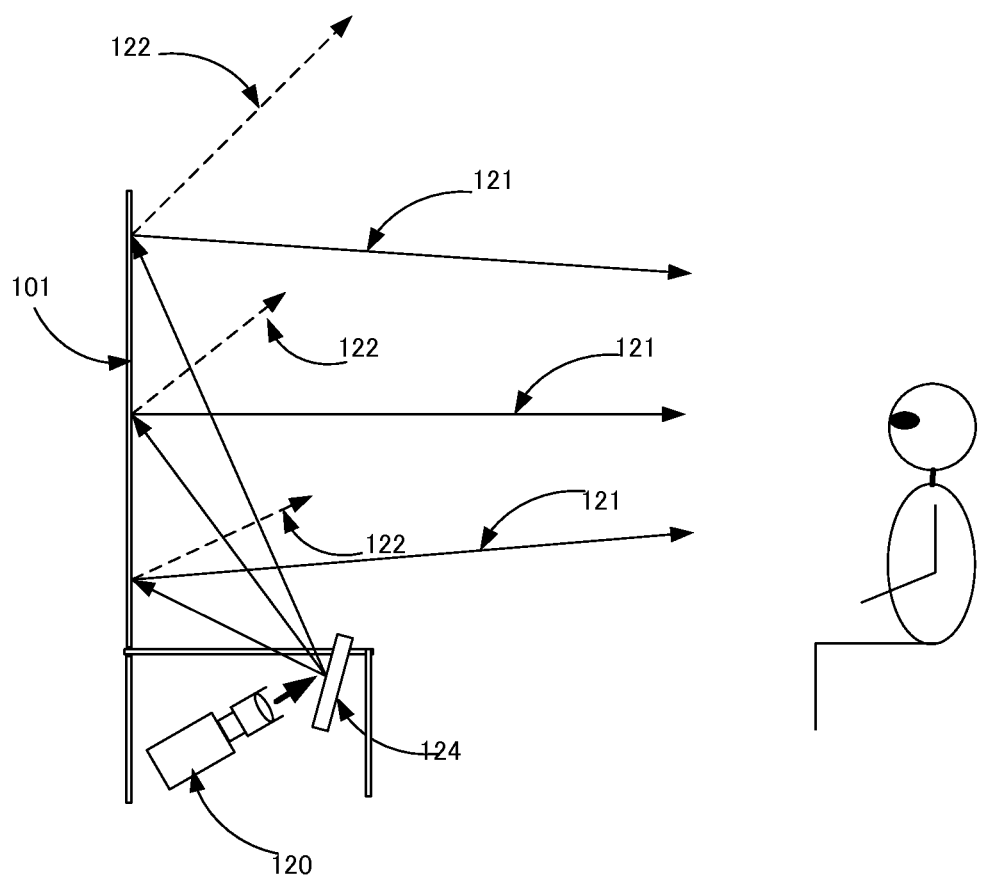
FIG. 5 is a diagram to illustrate a reconstruction of the light beams by applying the hologram shown in FIG. 2.

FIG. 2 shows an alternate embodiment of an image display system this invention. The display system shown in FIG. 2 is similar to that of FIG. 1 except that the object beams 102A are converging instead of parallel as that shown in FIG. 1. The reconstruction of the light beams is shown in FIG. 5 wherein the reflected light 121 is converging toward the viewer for displaying an image with increased brightness.

Figure 3:
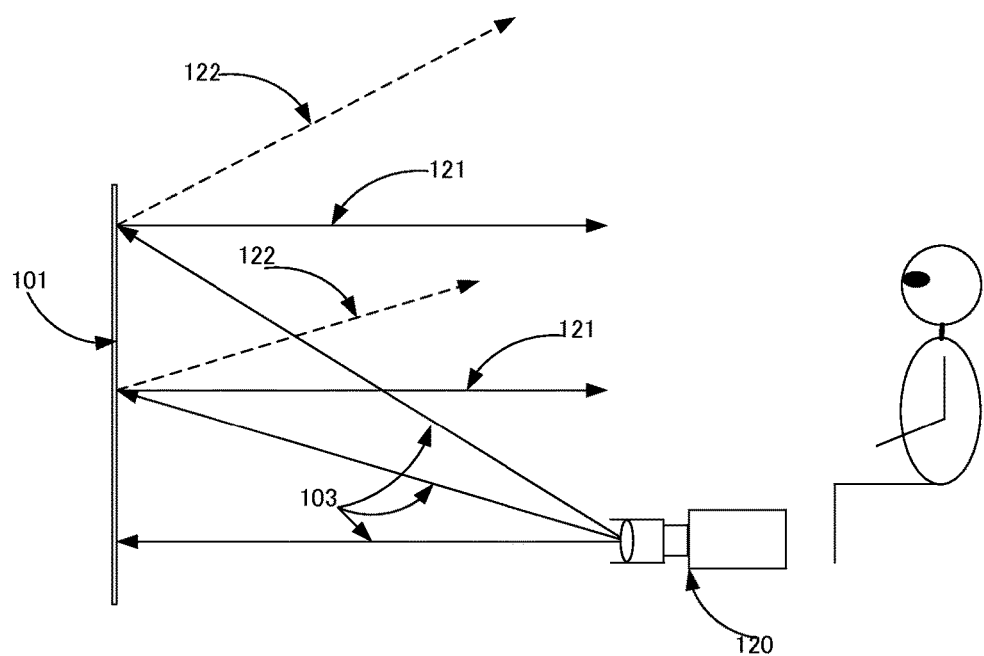
FIG. 3 is a diagram to illustrate a reconstruction of the light beams by applying the hologram shown in FIG. 1.
Figure 4:
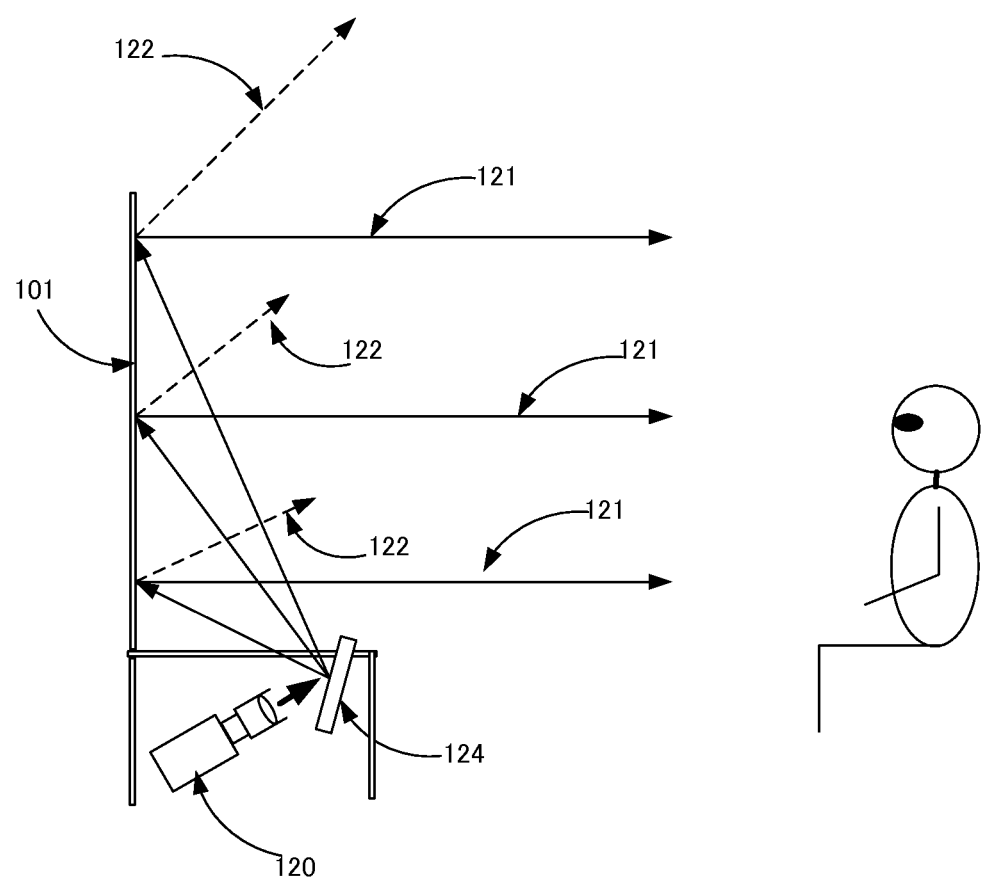
FIG. 4 shows an alternate embodiment of a display system of this this invention with the projector placed under the screen and the outputted light is reflected by a mirror to make a smaller display system.

FIG. 3 is a diagram to illustrate a reconstruction of the light beams by applying the hologram shown in FIG. 1. The hologram is recorded on the photographic film coated on the screen 101. In order to display images on the screen 101 by a reconstruction process the beam 103 projected from projector 120 in FIG. 3 must be projected along the same direction with the same wavelength as the reference beam 103 in FIG. 1. When the reconstruction beam is projected along the same direction and has the same wavelength as the reference beam, the reflected beam 121 is projected in the same direction as the object beam 102 in FIG. 1 instead of regular reflection direction 122 reflected from an ordinary screen without a coated photographic film recorded with the hologram as now provided in the screen 101 of the present invention. As shown in FIG. 3, the light beams 122 reflected from an ordinary mirror do not reach the viewer. Therefore, the corners will appear as dark without showing any images. Thus, the hologram screen 101 of this invention now functions as a curved mirror and a wavelength selective mirror as well as ambient light absorber. For these reasons, the hologram screen will create high contrast images because a black image will be shown as dark even under bright ambient. An actual application is shown in FIG. 3 to display images of images projected from the projector 120. The projected light beams 103 are reflected toward the direction of 121 and the viewer now perceives the reflected images with higher contrast and brighter image quality. FIG. 4 shows an alternate embodiment of a display system of this this invention application with the projector 120 placed under the screen 101 and the outputted light is reflected by a mirror 120, so that the required space will be much smaller.

Figure 7:
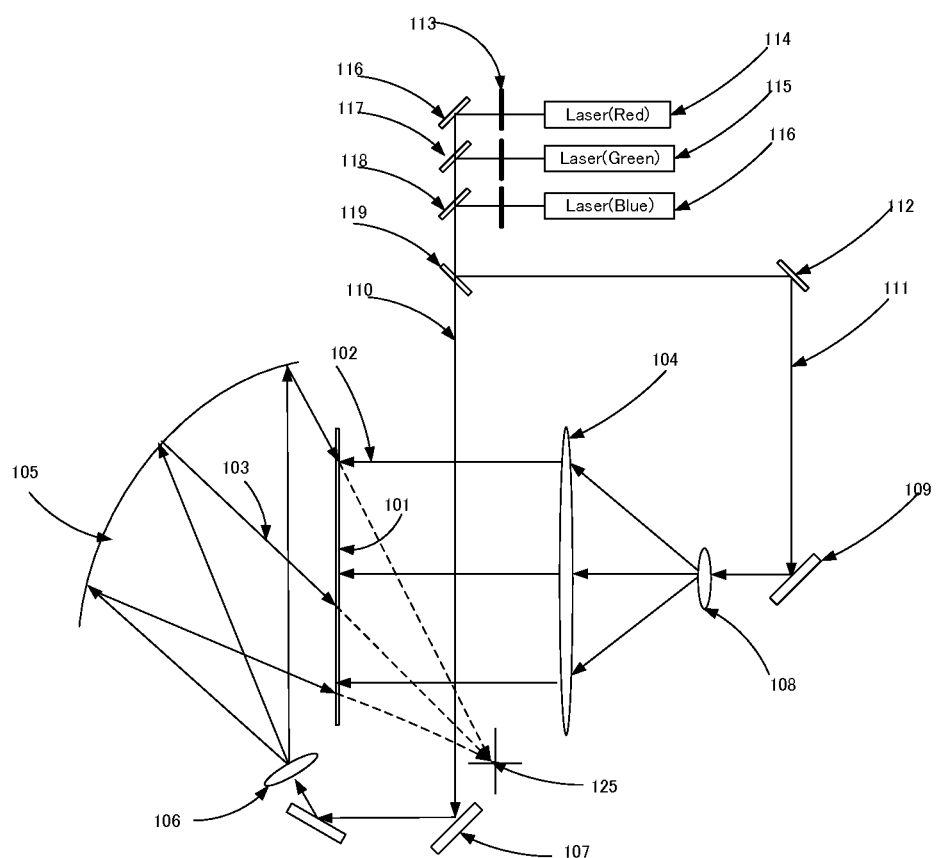
FIG. 7 is a diagram for showing another embodiment of this invention for recording the hologram wherein the optical configuration are arranged that both the reference and object beams are reversed.

Another example of this invention is shown in FIG. 7. For the purpose for recording of the hologram, the optical configuration are arranged that both the reference and object beams are reversed. In this case, it is necessary to arrange that the reconstruction beam and the reference beam are opposite. Then the reflected beam is opposite to the object beam of the reconstruction beam. In other words, when both the reference and object beams are reversed, then the reconstruction and reflected beams are also reversed as well.

Figure 8:
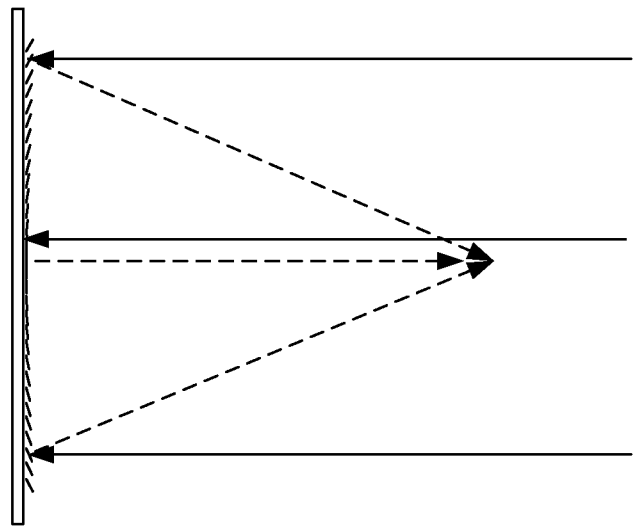
FIG. 8 shows the light paths of image display system of this invention wherein a screen for reflecting specific bandwidths of wavelength and having a Fresnel lens on top of the reflecting surface to reflect parallel lights.
Figure 9:
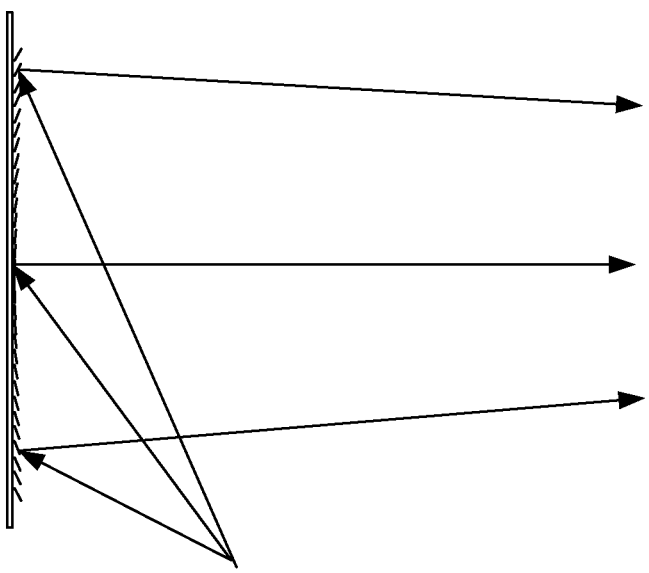
FIG. 9 shows the light paths of image display system of this invention wherein a screen for reflecting specific bandwidths of wavelength and having a Fresnel lens on top of the reflecting surface to reflect converged lights.

FIG. 8 and FIG. 9 show the light paths of two alternate embodiments of this invention. The light paths as that shown in these figures includes a screen for reflecting specific band-widths of wavelength and having a Fresnel lens on top of the surface to reflect parallel lights as shown in FIG. 8, or to reflect converged lights as shown in FIG. 9. The focal lengths of the Fresnel mirrors in FIG. 8 and FIG. 9 are different. Both are Fresnel mirrors, but with different focal length. Depending of the distance of viewers, the Fresnel lenses of different focal lengths may provide better images for a very far viewer's position as that shown FIG. 9 and alternatively in a closer viewer's position as FIG. 8. In alternate embodiment, the reflecting surface may also be made of multi-layers of dielectrics or cholesteric liquid crystal and a Fresnel lens adhered on the reflecting surface. The purpose of the screen of multi-layers of dielectrics or cholesteric liquid crystal and a Fresnel lens adhered on the reflecting surface is to achieve higher contrast in a bright room with front projector. Specifically, the function of this screen is to reflect only the primary colors and absorb all the rest of colors, so that the contrast of reflected image becomes higher. High contrast is achieved when the black image is as dark as possible and bright image is as bright as possible because the contrast is defined as the ratio of brightest/ "darkest". This invention resolves the problem caused by the ambient reflection that the black image of front the projector does not become black, but gray. By reflecting only the primary colors, the black pixels of the images now are now shown with a darker color thus significantly improves the contrast. The improvements are further explained by reviewing the situations that when the screen reflects all the spectrum of colors and the ambient light in a bright room is 200 lumens to the screen, a front projector with 2000 lumen output can have only 2000:200=10:1 contrast ratio, because even zero output (black image) will have 200 lumen output and the darkest is 200 lumens. The spectrum of visible light is from 390 nm to 700 nm, about 310 nm width. If the screen reflects only blue (from 450 to 460 nm, having 10 nm width) and green from (530 to 540 nm having 10 nm width) and red (640 to 650 having 10 nm width) and absorb all the rest of wavelength and the ambient light, the reflection of the ambient light of 200 lumens will become 20 lumens, because 30/310 (10 nm+10 nm+10 nm=30 nm/310 nm)=about 1/10. The reflected ambient light becomes about 1/10 of the incoming ambient light. This will improve the contrast ratio to 2000:20=100:1. 100:1 contrast ratio is about same as that of regular LCD TVs. If we can make the reflection of ambient light in a bright room 1/10, front projectors will have as good picture quality as LCD. The power consumption of LCD is twice higher and the price is three times higher than those of front projectors. In the embodiments of the present invention, the purpose of multi-layer dielectric and Cholesteric liquid crystal is to reflect only primary colors, more precisely only specified bandwidths of colors, in other words, wavelength selective reflection. The rest of colors passes through the film and will be absorbed by the backing sheet which is black. Furthermore, in the alternate embodiments, the purpose of Fresnel lens or mirror is to change the directions of reflected light beams from diverging directions to converging directions.

Figure 10:
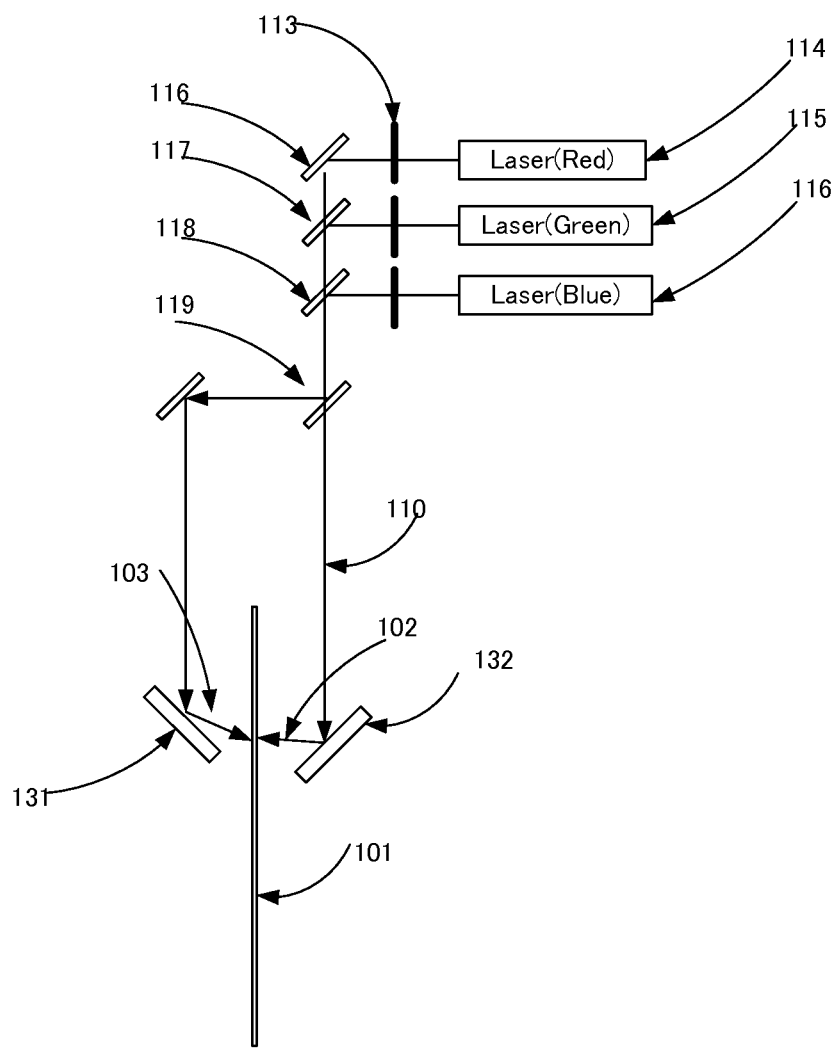
FIG. 10 shows an exemplary embodiment that is able to record hologram with a low power laser light sources by exposing a small area at a time with a programed variable incident beam angle with Galvano-mirrors.

FIG. 10 is a system diagram for showing another exemplary embodiment of this invention. As the size of screen gets larger, the power of laser light sources needs to increase. However, the cost of laser light source is exponential to the power. Therefore it is critically important to provide an image system that can record a large sheet of hologram with a low power laser light sources. FIG. 10 shows an exemplary embodiment that is able to record hologram with a low power laser light sources by exposing a small area at a time with a programmed variable incident beam angle with Galvano-mirrors 131 and 132. The display system as shown can control the reflecting angle in a single dimension as well as two dimensions, and scan the exposed area. The Galvano-mirror as shown in FIG. 10 is implemented to adjust the angle of incident beam with the screen moved to scan the exposed area.

Figure 11:
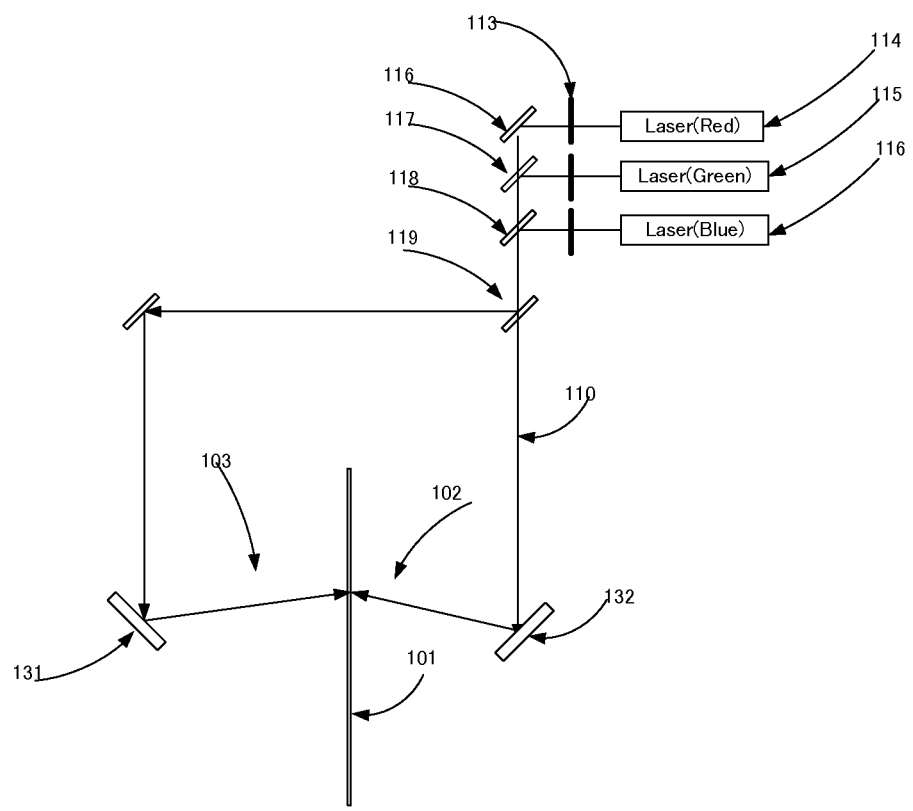
FIG. 11 is a block diagram for showing another exemplary embodiment of this invention wherein the screen is stationary and the Galvano-mirrors or micro-mirrors scan the incident beams with preprogramed angles to control the incident angle of beams at each area identical to those as shown in FIG. 1 and FIG. 2.

FIG. 11 is a system diagram for showing another exemplary embodiment of this invention to achieve the same purpose of a system as shown in FIG. 10. The screen is of this embodiment is stationary and the Galvano-mirrors or micro-mirrors 131 and 132 scan the incident beams 102 and 103 with preprogrammed angles so that the incident angle of beams at each area are controlled to be identical to those as shown in FIG. 1 and FIG. 2.

Figure 12:
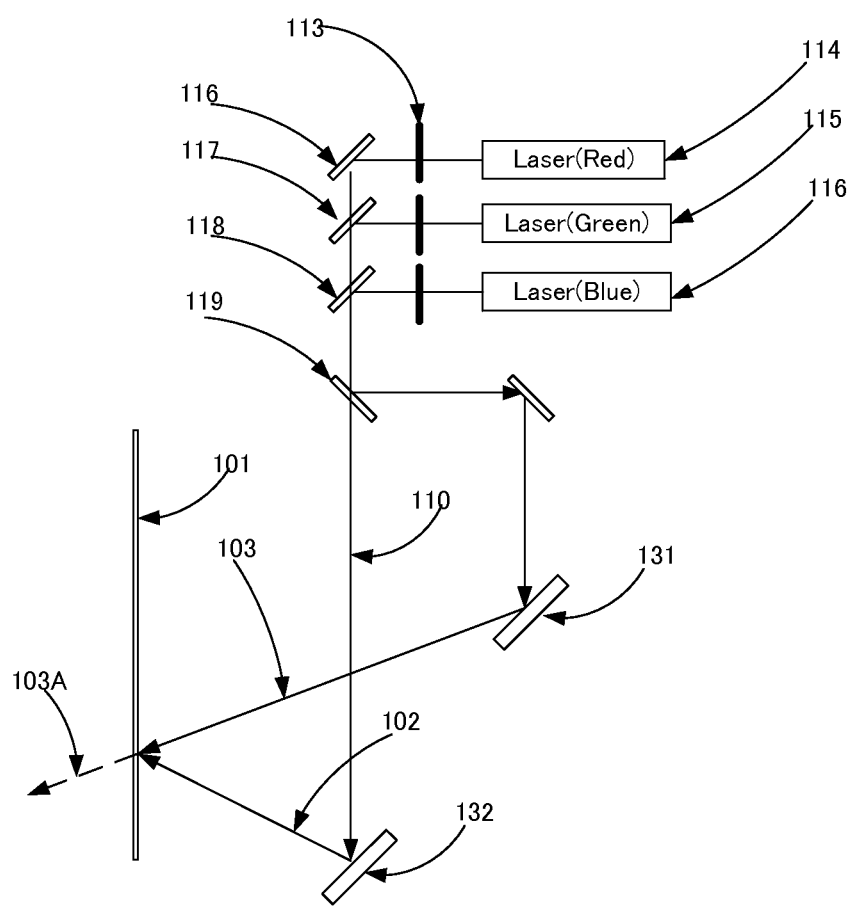
FIG. 12 is a block diagram for showing another exemplary embodiment of this invention to create a hologram screen which is transmissive instead of reflective.

FIG. 12 is a system diagram for showing another exemplary embodiment of this invention to create a hologram screen which is transmissive instead of reflective as the previous examples. In FIG. 12, the reference beam 102 and the object beam 103 are from the same side. Mirrors 131 and 132 may be implemented with Galvano-mirrors to scan the beams as that shown in FIG. 11. Alternately, mirrors 131 and 132 can be curved mirrors or a combination of lens and mirror, so that the entire screen can be exposed at a time. In this case, the reconstruction beam will be same as 102 and the transmissive beam is 103A.

Figure 13:
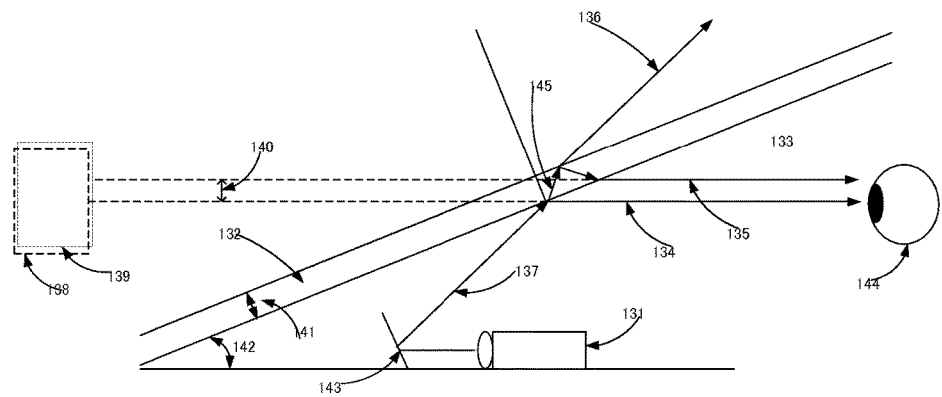
FIG. 13 shows a conventional HUD.

FIG. 13 shows a prior art of HUD. A projector 131 is placed on a compartment of automobile. The projected light is reflected by a mirror 143 and the reflected light 137 is reflected again by the windshield 132. The incident light beam will be split into two beams. A first beam 134 is projected toward the viewer 144. A second beam 135 is projected toward the inside surface of glass 145 and split into two beams. The beam 136 is transmitted outside of glass and the other beam 137 is reflected to the inside of glass and then transmitted toward the viewer 144. Both of these two beams 134 and 135 will come to the viewer 144 and these created dual images 138 and 139. The first beam 134 is brighter than the second beam 135 and the second image 139 is often considered as a ghost image. This ghost image is very annoying to the viewer 144. Another problem of the system in FIG. 13 is that the reflectance of the first beam 134 is very low. If the angle of windshield 142 is 22 degrees and the angle of the reflected beam 137 is 44 degrees, the reflectance of the first beam 134 will be about 15% and that of the second beam 135 is about 10%. Even the addition of both the beams 134 and 135 will be about 25%. Under bright ambient such as direct Sun beam, it will be difficult to get high contrast or almost not visible. If a mirror is placed at the windshield, the reflectance and ghost image problems will be resolved, but the viewer cannot see through the windshield. The view cannot be obstructed for safety of driving.

Figure 6:
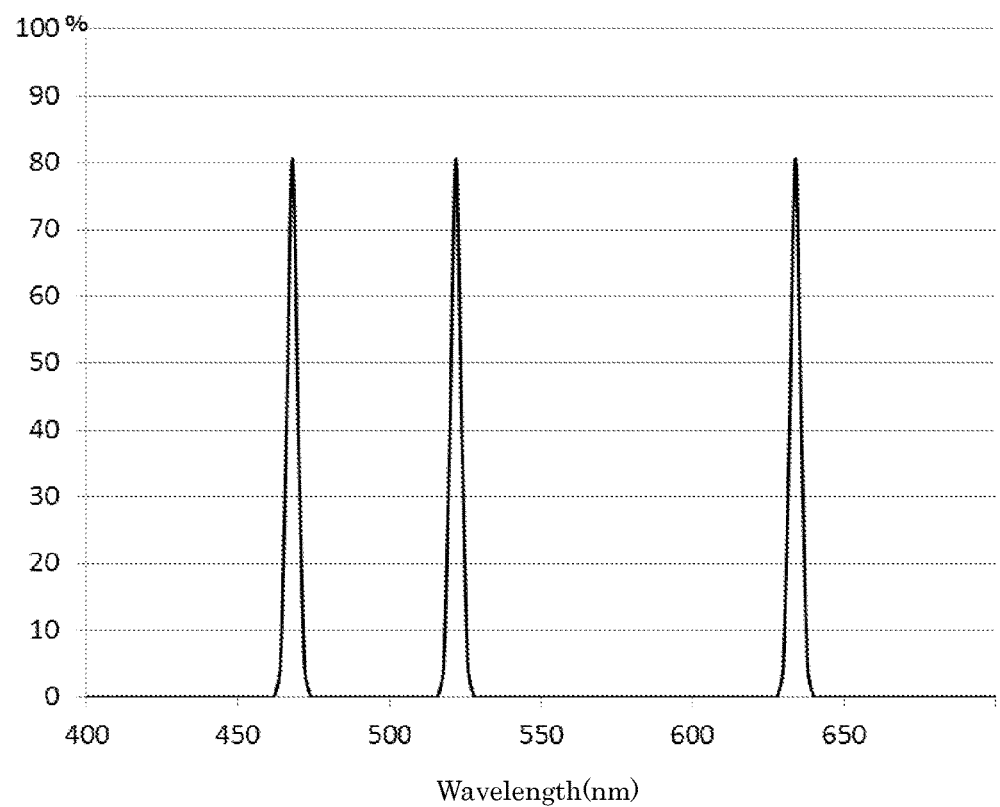
FIG. 6 shows the reflectance of the light beams as function of wavelengths for choosing the band-width of primary colors to implement in an optical system shown in FIG. 14.
Figure 14:
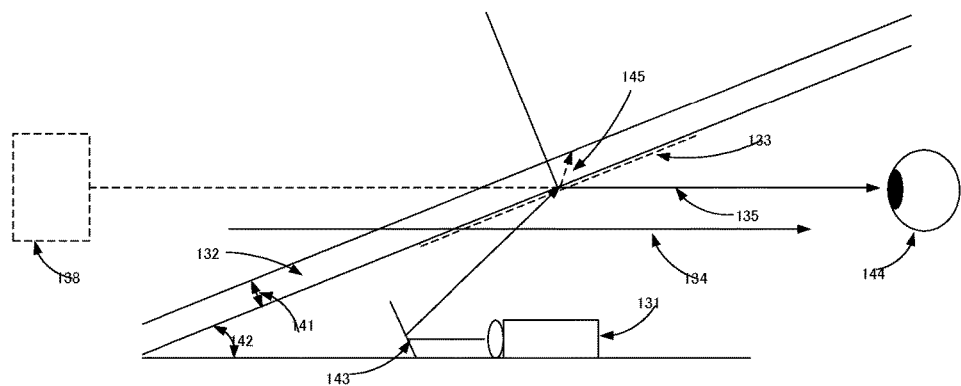
FIG. 14 illustrates an optical system of this invention to provide a new and improve optical configuration to overcome the problems of ghost image and low brightness that presented in the optical system shown in FIG. 13.

FIG. 14 illustrates an optical system of this invention to provide a new and improve optical configuration to overcome these problems of ghost image and low brightness. A screen of this invention 133 is added to the HUD system shown in FIG. 13, the ghost image is eliminated and also the reflectance by the screen 133 as a wavelength selective reflective film that may comprise one of cholesteric liquid crystal, multi-layer dielectric or hologram is substantially improved. In this embodiment, the rest of colors are passed through the film. The purpose of this film is to increase the reflection by the windshield, although the majority of incoming light (to see through the windshield) will pass though the film. In other words, the viewer can see through the windshield and also can see the reflected image. As explained previously, wavelength selective reflection film can reflect nearly 90% of primary colors (Blue, Green and Red) even though the rest of light can be transmitted. This means that almost all of the light from the projector 131 is reflected toward the viewer 144 and no ghost image is created. The majority of external light 134 is transmitted through the windshield 132 and the screen 133, assuming the external light contains nearly uniform spectrum of light and only narrow band width of primary colors are reflected. This assumption is very reasonable, because the spectrum of the Sunlight is very broad and uniform. By choosing the bandwidth of primary colors as the example in FIG. 6, 85% of transmission can be achieved. Thus, compared with the example of conventional HUD which has 25% light reflectance and ghost image problem, this invention provides three times brighter image with no ghost image without scarifying see-through capability.

Figure 15:
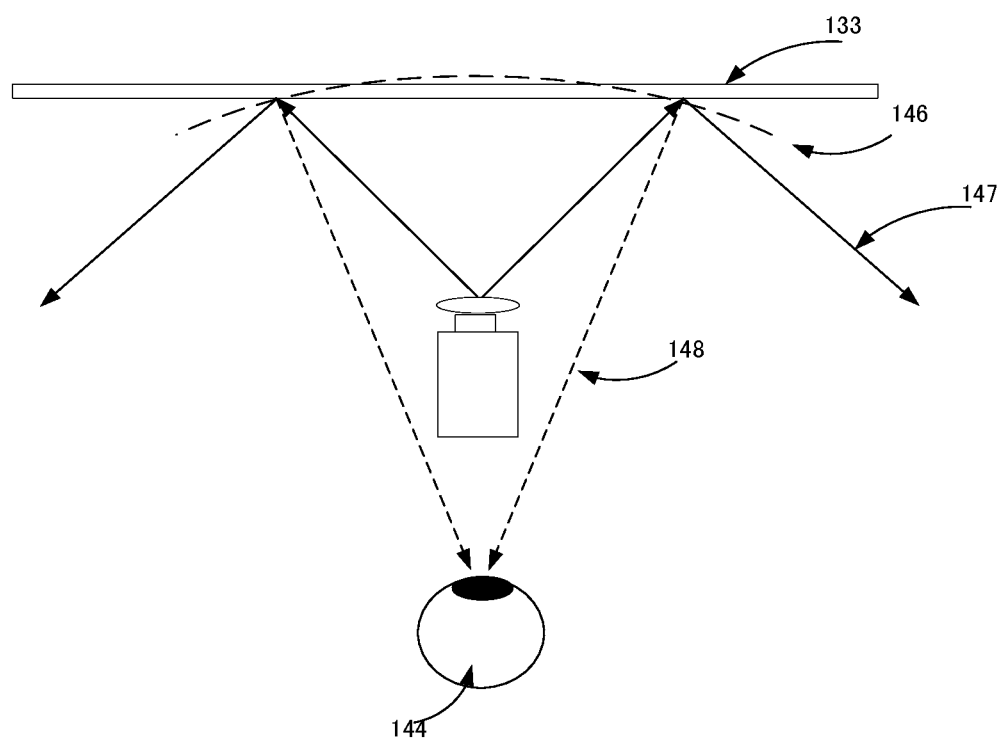
FIG. 15 is a system diagram for showing an optical system to resolve the "Dark Corner" problem.

FIG. 15 is a system diagram for showing an optical system to resolve the "Dark Corner" problem. A projector projects light beams 137 to the screen 133 with hologram. In this system, a conventional screen without the hologram will reflect the beam 137 toward 147 instead of projecting toward the designated direction 148 for the viewer 144. In order to resolve this problem, FIG. 15 illustrates an embodiment of this invention by placing a flat hologram having reflected beams as 148 with the reconstruction beams 137 reconstructed and projected from the hologram 133, and the beams are reflected as if there is a curved mirror 146 and the dark corner problem is resolved. Compared to the wavelength selection function in a system implemented with the cholesteric liquid crystal and multi-layer dielectric layers, this embodiment of using the screen with hologram has the benefits of both narrow band spectrum selectivity and powered lens action of recording object beams reflected by curved mirrors with a focal point.

Figure 16:
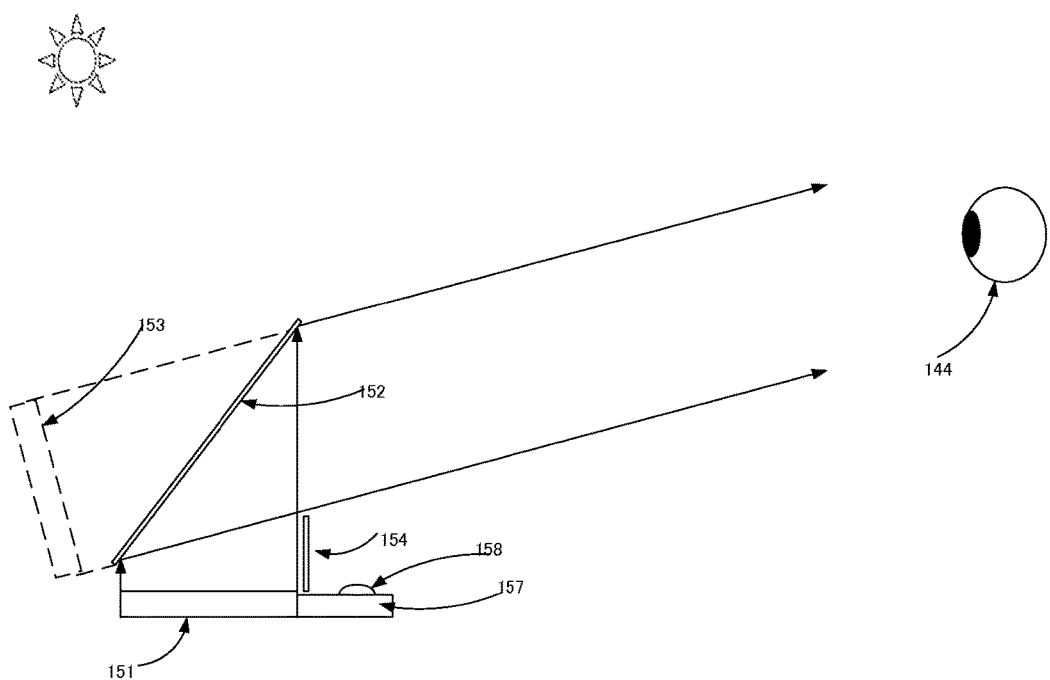
FIG. 16 illustrates another example of screen for HUD using a mobile phone instead of a projector.

FIG. 16 illustrates another example of screen for HUD using a mobile phone instead of a projector. Recently, the mobile phones are now provided with image display having greater brightness and higher resolution and are also implemented with more navigation software. There are tremendous demands for drivers to see the image of the display of mobile phone in the windshield so that the driver can keep their eyes on external view for safer driving. Looking back and forth between an internal navigation system and external view causes high risk of driving. Especially elder people cannot adjust their focal length of eyes fast enough to catch up with the external view. Therefore, it will be much safer if the image of navigation map in their mobile phone is projected onto the windshield. This invention provides an improved solution to achieve this purpose. A mobile phone 151 is placed on the compartment of automobile. A wavelength selective screen 152 with a transparent backing sheet or plate is placed as in FIG. 16. The screen 152 functions as if a mirror and an image 153 is created and the viewer 144 can see the image 153. Because of the transparent backing sheet, the screen 152 is transparent and the viewer 144 can see through the windshield. The "Corner Dark" problem can be avoid, if the screen 152 has a holographic reflector or lens or Fresnel mirror. For the viewer 144 who does not intend to see the direct image of the display of mobile phone, a light shield 154 is placed as in FIG. 16. When the mobile phone 151 requires an operation by the viewer, it requires a user interface with button(s) 158 and/or voice recognition. If the system has only one reflective mirror as in FIG. 16, the display must be reversed horizontally by software. The system will be often used under Sunlight. The Sunlight will worsen the contrast of image with strong ambient light as well as damaging the screen 152 with strong ultra-violet (UV) light. Additional UV shielding film or coating is necessary to protect the screen. It is also very helpful to improve contrast by adding photochromic coating and/or film, so that the light transmission can vary depending on the ambient brightness.

Figure 17:
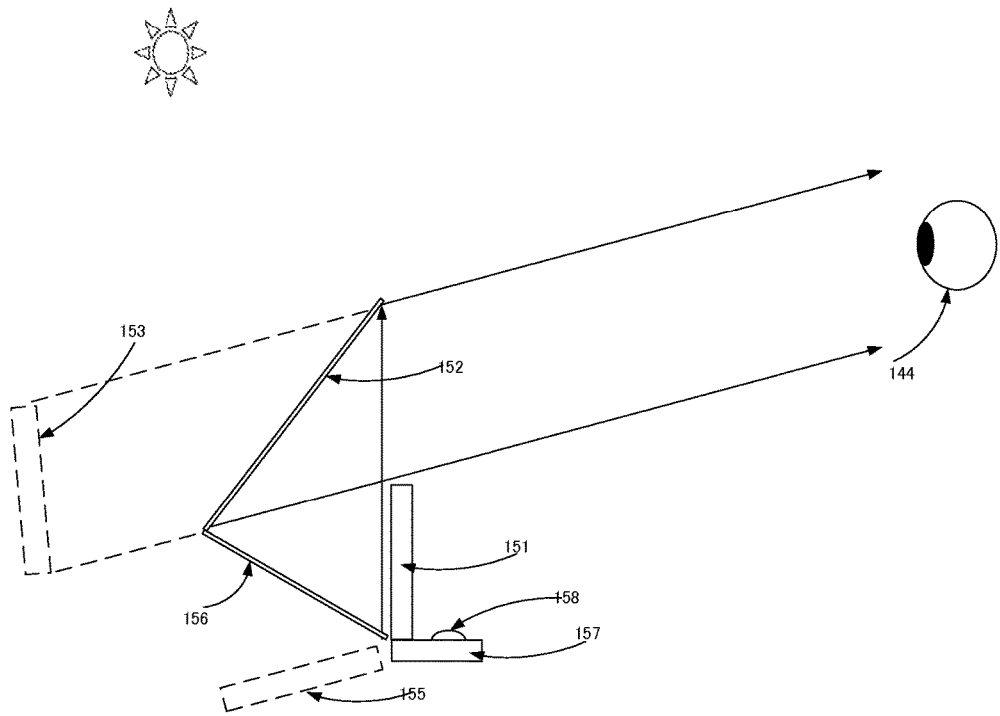
FIG. 17 illustrates another example of screen for HUD using a mobile phone.

FIG. 17 illustrates another example of screen for HUD using a mobile phone. By implementing software function to reverse the image of display not used, the image has to be reflected twice by mirrors as shown in FIG. 17. A mobile phone 151 is place on the compartment of automobile. An additional mirror 156 is placed between the mobile phone and the first mirror 152. The second mirror can be a regular mirror when the first mirror is wavelength selective mirror. A user interface is placed at 157 with buttons 158 or voice recognition.

Figure 18:
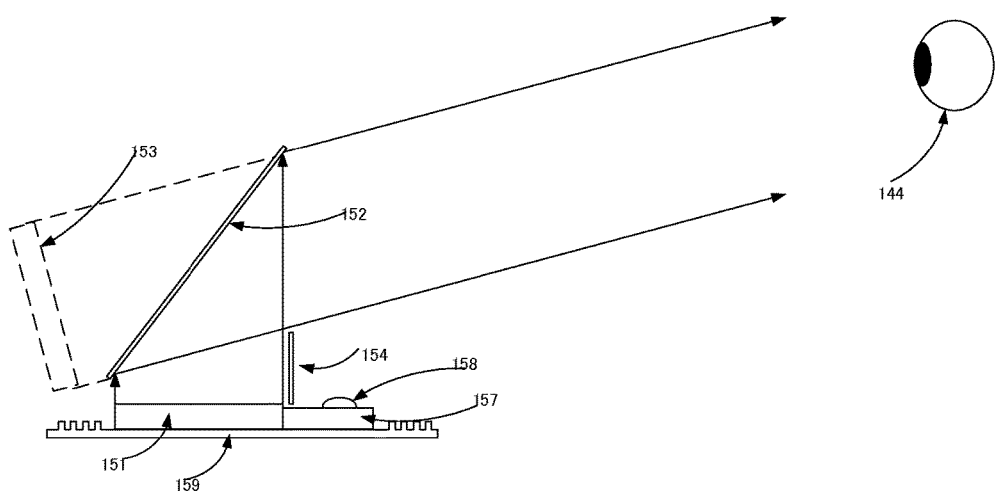
FIG. 18 illustrates another example of screen for HUD using a mobile phone.

FIG. 18 shows a screen for HUD using a mobile phone. When a HUD including a mobile phone is placed on a dashboard of car under strong Sunlight, the mobile phone can be over heated. FIG. 18 shows a heat sink (159) attached to the mobile phone. The heat-sink can be coated with black surface so that heat dissipation is improved.

Figure 19:
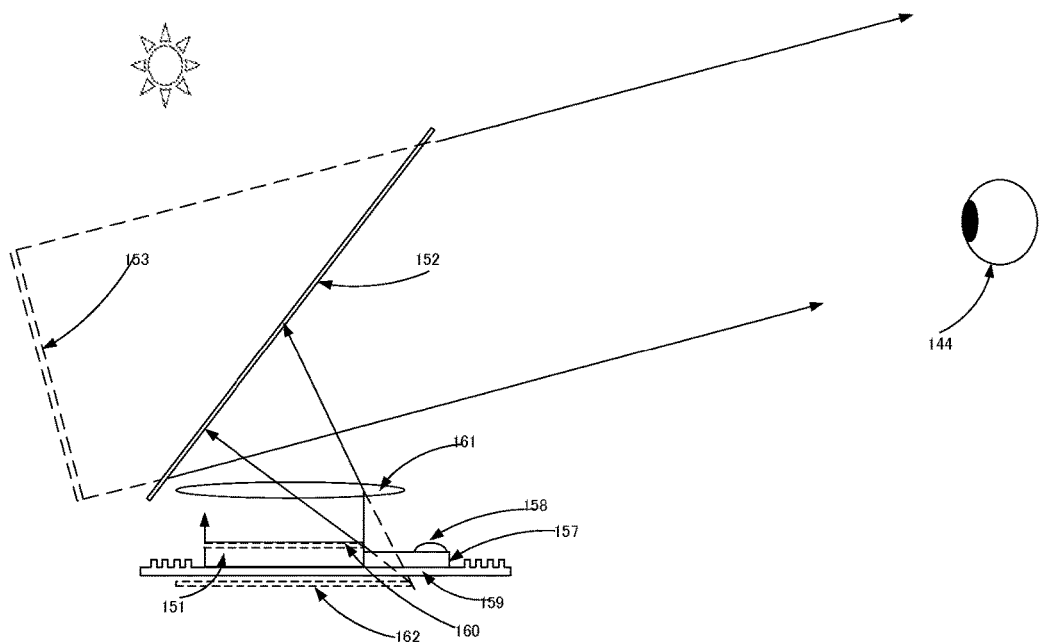
FIG. 19 illustrates another example of a HUD using a mobile phone and shows the method to enlarge the image by adding a lens.

FIG. 19 illustrates another example of a HUD using a mobile phone and shows the method to enlarge the image by adding a lens (161). The size of mobile phone is sometimes not large enough to see the display, such as navigation map. Viewers often have desire to see a larger image than the size of display of mobile phone. The lens (161) magnifies the display of mobile phone and the mirror (152) reflects the magnified image (155) to the image (153) for the viewer.

Figure 20:
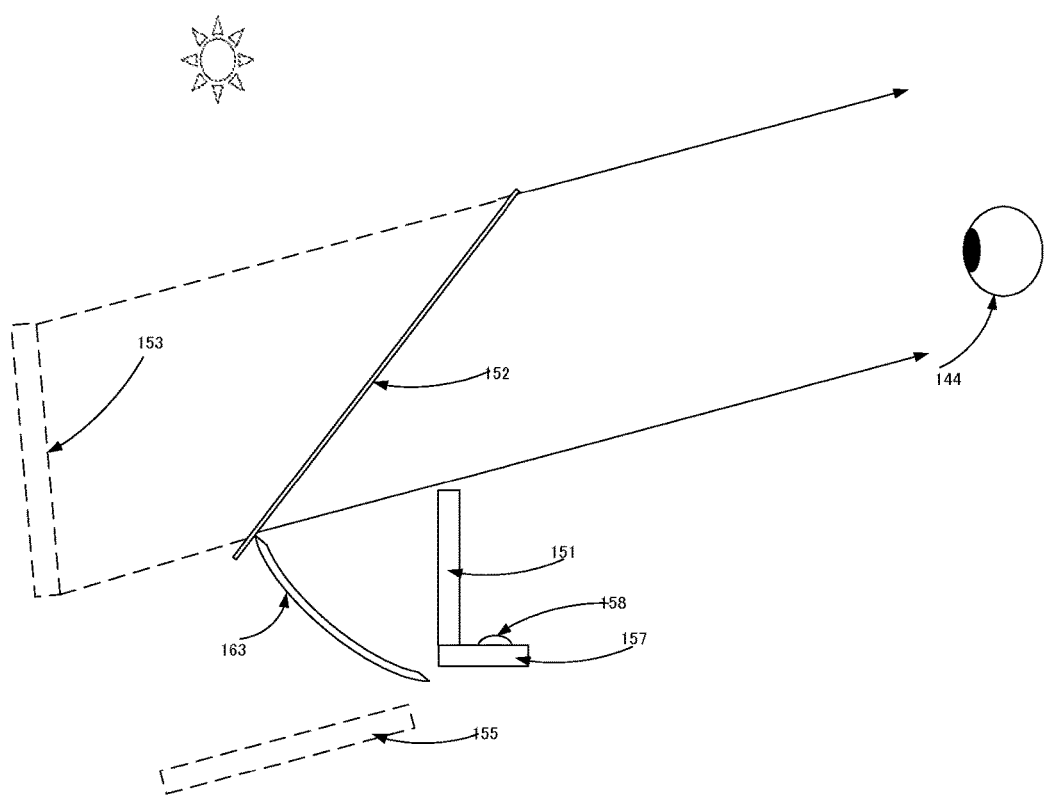
FIG. 20 illustrates another example of a HUD using a mobile phone and shows the method to enlarge the image by adding a curved mirror.

FIG. 20 illustrates another example of a HUD using a mobile phone and shows the method to enlarge the image by adding a curved mirror (163). The size of mobile phone is sometimes not large enough to see the display, such as navigation map. Viewers often have desire to see a larger image than the size of display of mobile phone. The curved mirror (163) magnifies the display of mobile phone and the mirror (152) reflects the magnified image (155) to the image (153) for the viewer.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:
1. A projection system for providing a holographic view to a viewer comprising:
   a projector and
   a screen with a reflecting surface comprising a hologram recorded from a plurality of spectrums generated from an interference of a reference light and an object light,
   wherein said spectrums of said reference light and object light are substantially matching spectrums of incident lights projected from the projector to said screen; and
   the hologram on the screen receives the reference light substantially along a direction toward the projector and the screen receives the object light along a direction of toward the viewer.
2. The projection system of claim 1 wherein:
   the reference and object beams are projected onto the screen wherein the object beam is reflected by a free shaped mirror whereby the free shaped mirror directs a reflected light of incident light from the screen toward pre-designated directions.
3. The projection system of claim 1 wherein:
   the screen further comprises a dark backing sheet to absorb the light transmitting through said hologram and a front surface of the screen scatters the incident lights.
4. The projection system of claim 1 wherein:
   the screen having a transparent backing sheet for the viewer to see through the screen.
5. A projection screen comprising:
   a hologram exposed with a reference beam and an object beam reflected by a free shaped mirror wherein a curvature of the free shaped mirror reflects a light projected from an image projector to a projection screen with a reduced distortion and color aberration.

6. A projection system comprising:
a projector and
a screen covered with Fresnel lens for reflecting a plurality of spectrums wherein said spectrums substantially match incident lights projected from said projector onto said screen.

7. The projection system of claim 6 further comprising:
a dark backing sheet to absorb lights transmitted through said Fresnel lens and the screen scatters the incident lights.

8. The projection system of claim 6 further comprising:
a transparent backing sheet for a viewer to see through said screen and the transparent backing sheet has layers from a group of
an UV shielding layer, photo-chromic layer and electro-chromic layer covering over the transparent backing sheet.

9. The projection system of claim 6 further comprising:
layers covering over the screen composed of materials selected from a group of multi-layer dielectrics and cholesteric liquid crystal.

10. A method of fabricating a hologram comprising:
coating a photo-sensitive film on a projection screen; projecting at least two coherent laser beams from a laser source; directing the laser beams by Galvano-mirrors to project to a preprogrammed direction projecting the laser beams to a segmented area of said photo-sensitive film and to expose the segmented area with said laser beams and continuously scan said Galvano-mirrors to expose the entire area of said photo-sensitive film.

11. A method of fabricating a hologram comprising:
coating a photo-sensitive film on a projection screen; projecting at least two coherent laser beams from a laser source; directing the laser beams by Galvano-mirrors to project to a preprogrammed directions to a segmented area of said photo-sensitive film and to continuously scan said photo-sensitive film to expose the entire area of said photo-sensitive film.

12. A head-up-display system comprising:
a mobile phone having a display and
a screen with a reflecting surface comprising a hologram recorded from a plurality of spectrums of reference light and object light,
wherein said spectrums of said reference light and object light are substantially matching spectrums of incident lights projected from the projector to said screen; and
the hologram on the screen is recorded by an object beam projected along a direction substantially toward a viewer using the mobile phone and substantially from a point where the mobile phone is placed for reference beam and a backing film of said reflecting surface is transparent.

13. The head-up-display system of claim 12 further comprising:
a heat sink attached to the mobile phone.

14. The head-up-display system of claim 12 wherein:
an image of said display is horizontally reversed whereby reflected images from the display have a normal direction to the viewer.

15. The head-up-display system of claim 12 wherein:
the system has at least one user interface to interface with the mobile phone for the viewer to control the mobile phone.

16. The head-up-display system of claim 12 further comprising:
a transparent backing sheet for the viewer to see through said projection screen and the transparent backing sheet; and
the transparent backing sheet comprises layers selected from a group of an UV shielding layer, photo-chromic layer and electro-chromic layer.

17. A head-up-display system comprising: a mobile phone having a display and a screen with a holographic layer for reflecting a plurality of spectrums wherein said spectrums are matched with the spectrums of incident lights from said display of the mobile phone.

18. The head-up-display system of claim 17 wherein:
the image of said display image is reversed for displaying reflected images along a normal direction to the viewer by applying a group of software control functions and an additional mirror.

19. The head-up-display system of claim 17 wherein:
the system has at least one user interface for a viewer to interface with and control the mobile phone.

20. The head-up-display system of claim 17 wherein:
the system further comprises a magnifying lens including a group of convex lens, concave lens and Fresnel lens, curved mirror and Fresnel mirror to enlarge a projected image.

21. The head-up-display system of claim 17 wherein:
a transparent backing sheet for the viewers to see through said projection screen and the transparent backing sheet; and
the transparent backing sheet further comprises layers selected from a group of an UV shielding layer, photo-chromic layer and transmissivity variable layer.

22. The head-up-display system of claim 17 further comprising:
a heat sink attached to the mobile phone.

23. A head-up-display system comprising:
a mobile phone having a display and
a screen includes a partially transparent layer for partially reflecting an incoming light and partially passing the incoming light; and
a transparent backing sheet for a viewer to see through said screen and wherein the transparent backing sheet comprises layers selected from an UV shielding layer, photo-chromic layer and electro-chromic layer covering over the transparent backing sheet.

24. The head-up-display system of claim 23 further comprising:
a heat sink attached to the mobile phone.

25. The head-up-display system of claim 23 wherein:
an image is reversed for displaying reflected images along a normal direction to a viewer by applying a group of software and an additional mirror.

26. The head-up-display system of claim 23 further comprising:
at least one user interface for a viewer to interface and control a mobile phone.

27. The head-up-display system of claim 23 further comprising:
a magnifying lens including convex lens, concave lens, Fresnel lens, curved mirror and Fresnel mirror to enlarge a projected image.

28. The head-up-display system of claim 23 further comprising:
a transparent backing sheet for the viewers to see through said projection screen and the transparent backing sheet; and the transparent backing sheet further includes layers selected from a group of an UV shielding layer, photo-chromic layer and electro-chromic layer.

* * * * *